(12) United States Patent
Zangvil et al.

(10) Patent No.: US 10,823,842 B2
(45) Date of Patent: Nov. 3, 2020

(54) SYSTEM AND METHOD FOR GENERATING A TEMPORAL MAP OF RADIO FREQUENCY (RF) SIGNALS

(71) Applicant: Regulus Cyber Ltd., Haifa (IL)

(72) Inventors: Yoav Zangvil, Haifa (IL); Yonatan Zur, Tel Aviv (IL); Gal Cohen, Haifa (IL)

(73) Assignee: Regulus Cyber Ltd., Haifa (IL)

( * ) Notice: Subject to any disclaimer, the term of this patent is extended or adjusted under 35 U.S.C. 154(b) by 186 days.

(21) Appl. No.: 16/055,611

(22) Filed: Aug. 6, 2018

(65) Prior Publication Data

US 2019/0064343 A1 Feb. 28, 2019

Related U.S. Application Data

(60) Provisional application No. 62/541,713, filed on Aug. 6, 2017.

(51) Int. Cl.

| G01S 13/89 | (2006.01) |
| H04B 17/26 | (2015.01) |
| H04B 1/00 | (2006.01) |
| H04B 17/318 | (2015.01) |
| H04B 17/345 | (2015.01) |
| H04B 17/336 | (2015.01) |
| G01S 3/02 | (2006.01) |

(52) U.S. Cl.
CPC .......... *G01S 13/89* (2013.01); *G01S 3/02* (2013.01); *H04B 1/0003* (2013.01); *H04B 17/26* (2015.01); *H04B 17/318* (2015.01); *H04B 17/336* (2015.01); *H04B 17/345* (2015.01)

(58) Field of Classification Search
CPC combination set(s) only.
See application file for complete search history.

(56) References Cited

U.S. PATENT DOCUMENTS

| 8,878,725 | B2 | 11/2014 | Lu | |
| 8,878,726 | B2 | 11/2014 | Lu | |
| 9,696,430 | B2 | 7/2017 | Park et al. | |
| 2007/0150186 | A1* | 6/2007 | Ingulsrud | G01C 21/32 701/431 |
| 2014/0274151 | A1* | 9/2014 | Pattabiraman | H04W 52/283 455/456.3 |
| 2015/0257156 | A1 | 9/2015 | Bose et al. | |
| 2016/0269917 | A1 | 9/2016 | Hillegas, Jr. et al. | |
| 2017/0013478 | A1 | 1/2017 | Singh et al. | |
| 2017/0192089 | A1* | 7/2017 | Parker | F41H 11/02 |
| 2017/0196171 | A1* | 7/2017 | Xu | H04L 43/045 |
| 2018/0038695 | A1* | 2/2018 | Bitra | G08G 5/0069 |
| 2018/0313950 | A1* | 11/2018 | Mohamadi | G01S 13/888 |

\* cited by examiner

*Primary Examiner* — Mamadou L Diallo
(74) *Attorney, Agent, or Firm* — M&B IP Analysts, LLC

(57) ABSTRACT

A system and method for generating a temporal map of radio frequency (RF) signals detected from a vehicle. The method includes: detecting a plurality of RF signals over a predetermined spectrum of frequencies at a first longitude, a first latitude and a first altitude; analyzing the plurality of RF signals to determine at least a first parameter associated with at least a first RF signal of the plurality of RF signals; and adding to the temporal map the first RF signal frequency, the at least a first parameter associated with the first RF signal, the first longitude, the first latitude and the first altitude.

13 Claims, 3 Drawing Sheets

SYSTEM AND METHOD FOR GENERATING A TEMPORAL MAP OF RADIO FREQUENCY (RF) SIGNALS

CROSS-REFERENCE TO RELATED APPLICATIONS

This application claims the benefit of U.S. Provisional Application No. 62/541,713 filed on Aug. 6, 2017, the contents of which are hereby incorporated by reference.

TECHNICAL FIELD

The present disclosure relates generally to unmanned aerial vehicles (UAVs), and more particularly to a UAV that is configured to generate a temporal map of radio frequency (RF) signals detected by the UAV.

BACKGROUND

Unmanned aerial vehicles (UAVs) are finding increasing use in industry. Improvements in artificial intelligence, battery life, and computational power all contribute to this evolvement. Currently, UAVs are used by entities, such as armies, police forces, corporations, and the like, for various purposes, including inspecting wide areas from versatile angles, filming movie scenes, securing sensitive facilities, and the like.

A UAV is one component of an unmanned aircraft system (UAS), which includes a UAV, a ground-based controller and a system that enables communication between the UAV and the ground-based controller. The flights of UAVs may operate with various degrees of autonomy, either under remote control operated by a human operator or autonomously, guided by onboard computers.

Most UAVs use a radio frequency front-end that connects an antenna to the analog-to-digital converter and a flight computer that controls avionics. The avionic systems include communications, navigation, the display and management of multiple systems, and systems that are fitted to UAVs to perform individual functions. Currently, the components and systems installed on UAVs allow, among other things, remote control and transmission of data, such as video and images, from the UAV to the ground-based controller.

In many cases communication between the UAV and the ground-based controller is interrupted while the UAV is in the air away from the ground-based controller. The poor communication causes an unreliable communication link that may cause malfunction or loss of connection between the UAV and the ground-based controller, often due to weak radio frequency (RF) signal properties within a certain area.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for generating a temporal map of radio frequency (RF) signals detected from a vehicle, the method including: detecting a plurality of RF signals over a predetermined spectrum of frequencies at a first longitude, a first latitude and a first altitude; analyzing the plurality of RF signals to determine at least a first parameter associated with at least a first RF signal of the plurality of RF signals; and adding to the temporal map the first RF signal frequency, the at least a first parameter associated with the first RF signal, the first longitude, the first latitude and the first altitude.

Certain embodiments disclosed herein also include a non-transitory computer readable medium having stored thereon instructions for causing a processing circuitry to perform a process, the process including: detecting a plurality of RF signals over a predetermined spectrum of frequencies at a first longitude, a first latitude and a first altitude; analyzing the plurality of RF signals to determine at least a first parameter associated with at least a first RF signal of the plurality of RF signals; and adding to the temporal map the first RF signal frequency, the at least a first parameter associated with the first RF signal, the first longitude, the first latitude and the first altitude.

Certain embodiments disclosed herein also include a system for generating a temporal map of radio frequency (RF) signals detected from a vehicle, the system including: a processing circuitry; an antenna connected to the processing circuitry, where the antenna is configured to detect radio frequency (RF) signals; an RF receiver connected to the processing circuitry and the antenna, where the RF receiver is configured to converts the information carried by the RF signals received by the antenna into a usable form; and a memory coupled to the processing circuitry, the memory containing therein instructions that, when executed by the processing circuitry, configure the system to: detect a plurality of RF signals over a predetermined spectrum of frequencies at a first longitude, a first latitude and a first altitude; analyze the plurality of RF signals to determine at least a first parameter associated with at least a first RF signal of the plurality of RF signals; and add to the temporal map the first RF signal frequency, the at least a first parameter associated with the first RF signal, the first longitude, the first latitude and the first altitude

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
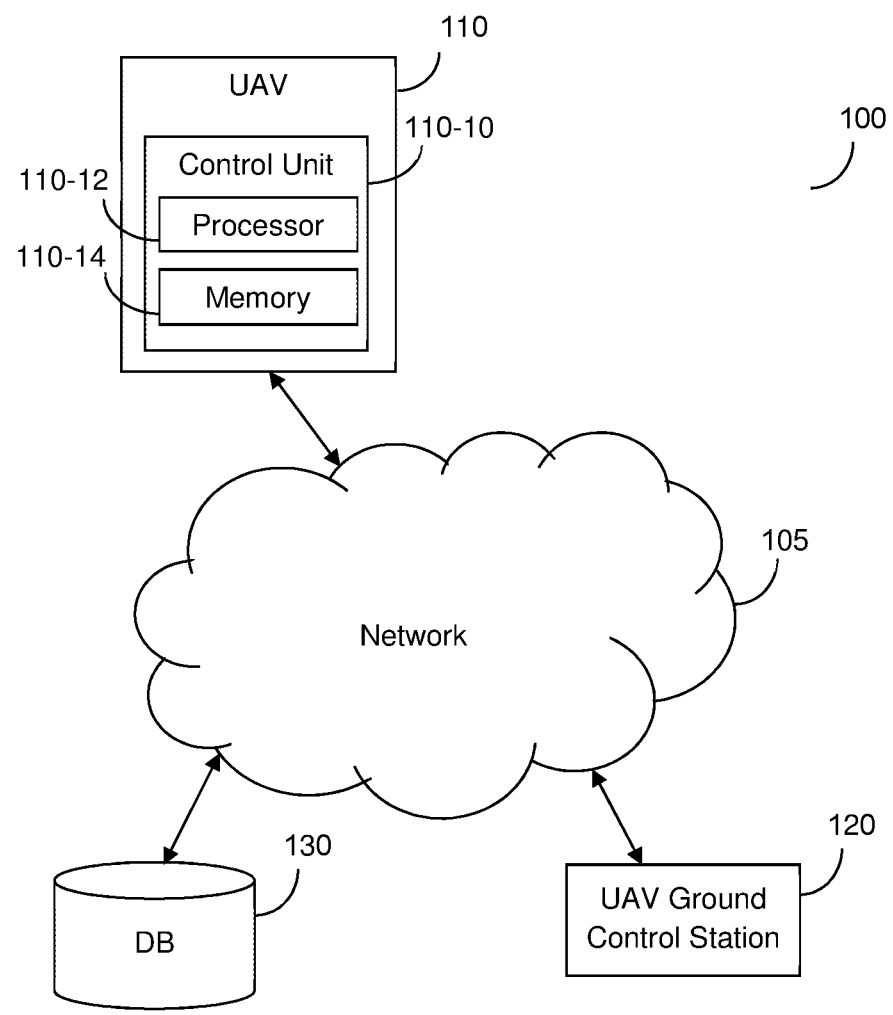
FIG. 1 is a schematic diagram of a system for generating a temporal map of radio frequency (RF) signals according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for generating a temporal map of radio frequency (RF) signals as a function of location and time. The system is utilized for creating a temporal map with values associated with several parameters that allow for the determination of the level of interference and the quality of detected RF signals at certain locations. The system uses an RF receiver and an antenna to detect RF signals over a predetermined spectrum of frequencies at a first longitude, a first latitude and a first altitude. The RF signals are analyzed and based on the analysis the system is able to determine at least a first parameter associated with the detected RF signals. Then, the system adds to the temporal map each RF signal frequency, and the corresponding parameters related thereto based on the longitude, latitude and altitude at which the RF signal was detected.

FIG. 1 is schematic diagram of a system 100 for generating a temporal map of radio frequency (RF) signals according to an embodiment. The system includes an unmanned aerial vehicle (UAV) 110, such as a drone, a UAV ground control station 120, and a database 130 connected via a network 105.

It should be noted that while the disclosed embodiments are directed to UAV, the methods and systems discussed herein apply to other vehicles as well, including land vehicles, such as cars and trucks, water vehicles, such as boats, and the like.

The network 105 is a network that enables communication between the components of the system 100 as further described herein below. The network 105 may be a cellular or wired network, a local area network (LAN), a wide area network (WAN), a metro area network (MAN), the Internet, the worldwide web (WWW), like networks, and any combination thereof.

The UAV 110 includes a control unit 110-10 that enables the UAV 110 to function autonomously during a mission, analyze data detected by the UAV 110, and the like. Data detected by the UAV 110 during a mission may include radio frequency (RF) signals, coordinates at which a particular RF signal was detected, an altitude, longitude and latitude at which the RF signal was detected, and the like. The control unit 110-10 includes a processing circuitry 110-12 and a memory 110-14.

The processing circuitry 110-12 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 110-14 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions cause the processing circuitry 110-12 to perform the various processes described herein. The UAV 110 further includes a plurality of components that are further described below regarding FIG. 2.

The ground control station 120 may include a ground communication module that enables the ground control station 120 to communicate with the UAV 110. The communication between the UAV 110 and the ground control station 120 may include transmission of data detected by the UAV 110 to the ground control station 120. In an embodiment, the ground control station 120 may include a computing device, such as a server, a personal computer, a smart phone, a tablet, and any other device capable of processing information. The database 130 may be designed to store data detected by the UAV 110, e.g., for future reference. In an embodiment, the data may be detected from a plurality of UAVs 110 and stored within the database 130.

According to an embodiment, a plurality of radio frequency (RF) signals is detected during a UAV 110 flight over a predetermined spectrum of frequencies, where the UAV 110 is located at a first longitude, a first latitude and a first altitude. The first longitude is a geographic coordinate that specifies the east-west position of a point on the Earth's surface. It is an angular measurement, often expressed in degrees ranging from −180° to +180°, relative to the Prime Meridian. The first latitude is a geographic coordinate that specifies the north-south position of a point on the Earth's surface. It is also an angular measurement, often expressed in degrees which range from 0° at the Earth's equator to 90° at each of the poles. The first altitude may be an absolute altitude, which is the height of the UAV 110 above the terrain over which it is flying. Alternatively, the first altitude may be a height above sea level. The first altitude can be measured using an instrument such as an altimeter embedded within the UAV 110.

Data, including data related to the RF signals, is detected using a communication module within the UAV 110 (shown in FIG. 2), such as a radio module that is configured to detect a predetermined spectrum of radio frequencies. The communication module may be a software defined radio (SDR). As a non-limiting example, while the UAV 110 flies in a certain area, a 900 megahertz (MHz) RF signal may be detected at latitude: 40°42'46.021" (40.712784), longitude: 74°0'21.388" (−74.005941) and altitude: 50 meters.

Upon detection of the plurality of RF signals, the plurality of RF signals is analyzed to determine at least a first parameter associated with at least a first RF signal of the plurality of RF signals. For example, the first parameter may describe properties related to the first RF signal, such as a signal-to-noise ratio (SNR) of the first RF signal, the RF signal strength, the RF signal permanent noise, and the like.

SNR is a value that compares the level of a desired signal to the level of background noise. The SNR is defined as the ratio of signal power to noise power, and is often expressed in decibels. A ratio higher than 1:1, greater than 0 dB, indicates more signal than noise. All real measurements of signals are disturbed by some level of noise, including electronic noise, wind, vibrations, gravitational attraction of the moon, variations of temperature, variations of humidity, and so on. According to one embodiment, the control unit 110-10 analyzes the information associated with the plurality of RF signals, such as the power of the detected RF signal and the power of the background noise.

For example a 902 megahertz (MHz) RF signal that has been detected at latitude: 40°42'46.021" (40.712784), longitude: 74°0'21.388" (−74.005941) and at altitude: 50 meters, may have a 10 dB SNR. According to the same example, the 10 dB SNR may be determined based on the analysis of the information associated with the detected RF signal, such as the power of the signal and the power of the background noise at the same coordinates.

The first parameter associated with the first RF signal may indicate the strength of the first RF signal. For example, upon analysis of the plurality of RF signals detected by the UAV 110, the control unit 110-10 may determine that the strength of the first RF signal is 40 d13μ (decibel-microvolts).

Then, the control unit 110-10 adds to a temporal map the first RF signal frequency, the at least one parameter associated with the first RF signal, the first longitude, the first latitude and the first altitude. The temporal map is an electronic document that may present visual description as well as textual description of a certain area with respect to analyzed data associated with the plurality of RF signals. The temporal map may be constantly updated by the control unit 110-10 as new RF signals are detected. In a further embodiment, where no temporal map exists for the area from which the RF signals were detected, a new temporal map is generated, and the first parameter associated with the first RF signal, the first longitude, the first latitude and the first altitude are added to the new temporal map.

As a non-limiting example, the temporal map may present an electronic map of New York City, where the RF signals that were detected by the UAV 110 at various location within the city are presented together with the coordinates at which the RF signals were detected, i.e., the first longitude, the first latitude and the first altitude. According to the same example, the at least one parameter associated with the detected RF signals at the exact coordinate, such as the SNR or the signal strength of the first RF signal, is also presented on the temporal map. The temporal map indicates areas within the city where RF signals are strong, e.g., where the UAV 110 can communicate with a ground control station 120, and where the RF signals are weak, e.g., where the SNR or signal interference is high.

According to another embodiment, the control unit 110-10 is configured to generate a data file, such as an electronic table, that allows the storing and classifying of the analyzed data with respect to coordinates at which the quality of the RF signal was, for example, relatively low, medium or high. In an embodiment, the quality of the first RF signal may be determined upon analysis of the at least one parameter associated with the first RF signal. The analyzed data may include descriptive information with respect to the RF signal, exact location at which the RF signal was detected, i.e., the longitude, the latitude, the altitude, and the at least one parameter associated with the detected RF signal.

According to an embodiment, the system 100 may include a plurality of UAVs 110 that are configured to detect data associated with a plurality of RF signals during their flight. The data detected by the plurality of UAVs 110 may be utilized for updating the interference level map. According to another embodiment the data may be stored in the database 130 for further usage.

In yet another embodiment, the control unit 110-10 of the UAV 110 may be configured to detect, using the communication module 110-20, the plurality of RF signals over the predetermined spectrum of frequencies at a second longitude, a second latitude and a second altitude. The second longitude, the second latitude and the second altitude may be different from the first longitude, the first latitude and the first altitude. The control unit 110-10 may be configured to determine, upon analysis of the plurality of RF signals, at least a second parameter associated with the at least a second RF signal of the plurality of RF signals. Then, the control unit 110-10 adds to the temporal map the at least a second RF signal frequency, the at least a second parameter associated with the at least a second RF signal, the second longitude, the second latitude and the second altitude.

Figure 2:
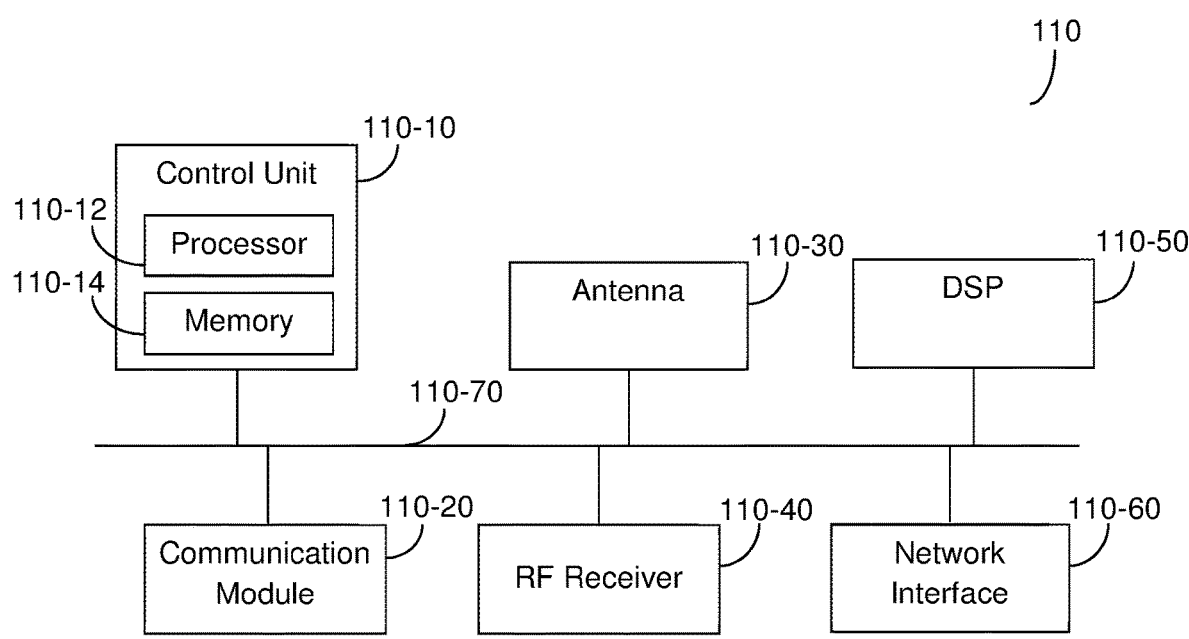
FIG. 2 is a block diagram of an unmanned aerial vehicle (UAV) according to an embodiment.

FIG. 2 is a schematic block diagram of the components of the UAV 110, according to an embodiment. The UAV 110 includes a control unit 110-10 that further includes a processing circuitry 110-12 and a memory 110-14. The memory 110-14 contains therein instructions that, when executed by the processing circuitry 110-12, configure the control unit 110-10 to execute actions as further described herein above with respect of FIG. 1.

The UAV 110 further includes a communication module 110-20 that allows the UAV 110 to communicate with the ground control station 120 and receive different types of signals from various sources. The communication module 110-12 may be, for example, a software defined radio (SDR).

The UAV 110 may include at least one antenna 110-30 that is an electrical device which converts electric power into radio waves and vice versa. The at least one antenna 110-30 enables the detection of the plurality of RF signals.

The UAV 110 further includes an RF receiver 110-40 that is an electronic component that receives radio waves and converts the information carried by them into a usable form. The RF receiver 110-40 is communicatively connected to the at least one antenna 110-30 and receives the plurality of RF signals detected by the at least one antenna 110-30.

The UAV 110 may further include a digital signal processor (DSP) 110-50. The DSP 110-50 allows the UAV 110 to filter, measure and compress real-world analog signals detected by the antenna 110-30 during the flight of the UAV 110. The UAV 110 further includes a network interface 110-60 that allows transmission of the analyzed data to a database such as a traditional database, cloud database, endpoint devices such as smartphones, etc. The network interface 110-60 may include a cellular interface, such as LTE, CDMA and the like, as well as a WiFi interface, and the like. The components of the UAV 110 may be connected via a bus 110-70.

Figure 3:
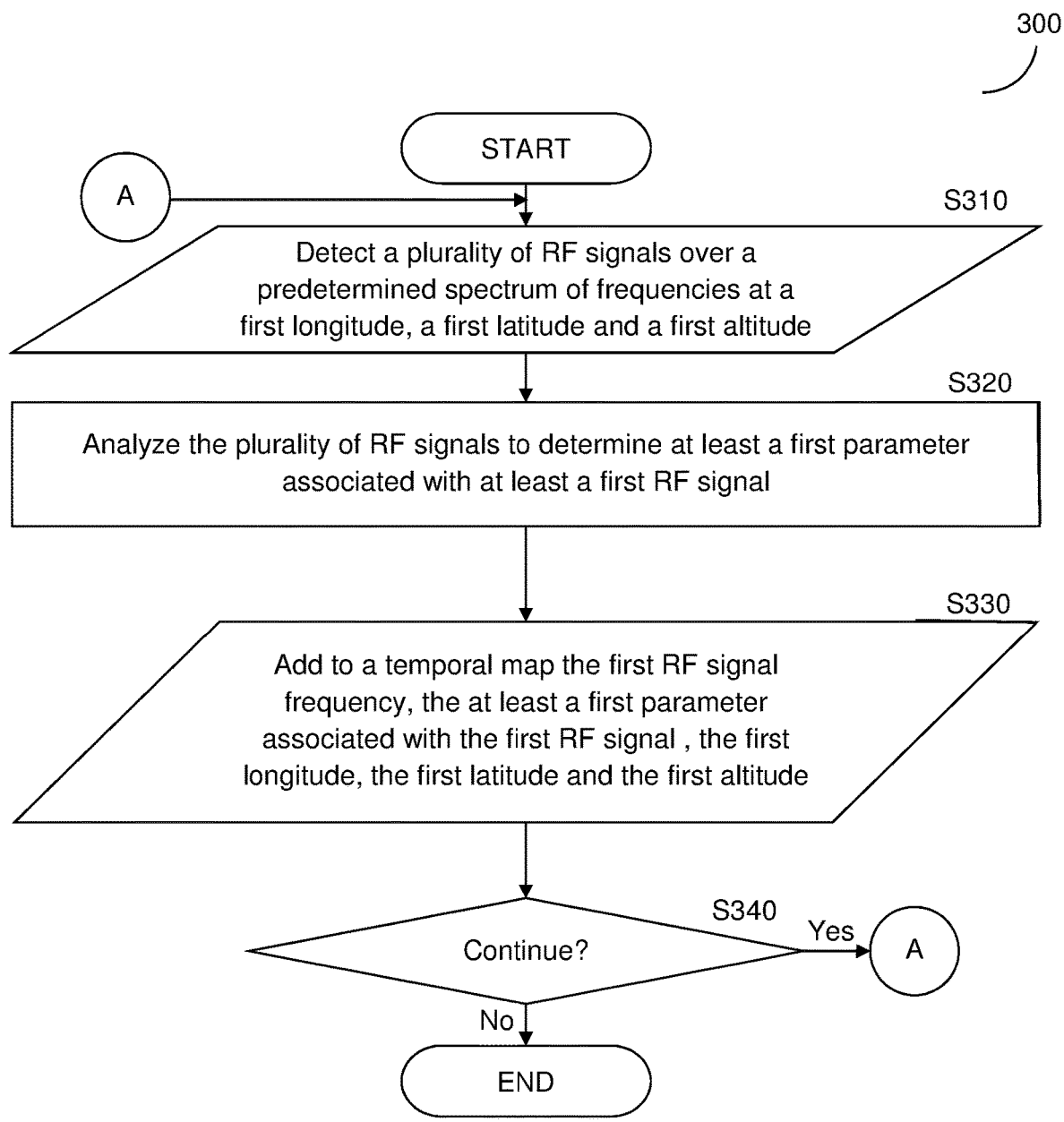
FIG. 3 is a flowchart of a method for generating a temporal radio frequency (RF) signal map according to an embodiment.

FIG. 3 is a flowchart that describes a method for generating a temporal map of radio frequency (RF) signals according to an embodiment. At S310, the operation starts when a plurality of radio frequency (RF) signals is detected over a predetermined spectrum of frequencies at a first longitude, a first latitude and a first altitude as further described herein above with respect of FIG. 1. The plurality of RF signals may be detected using the antenna 110-30 and the RF receiver 110-40.

At S320, the plurality of RF signals is analyzed. The analysis may include determining at least a first parameter associated with at least a first RF signal of the plurality of RF signals based on the identification of the longitude, latitude and altitude at which each RF signal was detected. The first parameter may describe properties related to the first RF signal, such as a signal-to-noise ratio (SNR) of the first RF signal, the RF signal strength, the RF signal permanent noise, and the like. These properties may be indicative of the quality of the RF signal, the interference level associated with the RF signal, and the like.

At S330, the first RF signal frequency, the at least a first parameter associated with the first RF signal, the first longitude, the first latitude and the first altitude are added to a temporal map. In an embodiment, the temporal map is added to a database for storage and future retrieval. The temporal map may be updated based on the analysis of multiple RF signals on a regular basis to increase the accuracy and breadth of the of map. In a further embodiment, where no temporal map exists for the area from which the RF signals were detected, a new temporal map is generated, and the first parameter associated with the first RF signal, the first longitude, the first latitude and the first altitude are added to the new temporal map.

At S340, it is checked whether to continue the operation and if so, execution continues with S310; otherwise, execution terminates.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for generating a temporal map of radio frequency (RF) signals detected from a vehicle, comprising:
   detecting a plurality of RF signals over a predetermined spectrum of frequencies at a first longitude, a first latitude and a first altitude;
   analyzing the plurality of RF signals to determine at least a first parameter associated with at least a first RF signal of the plurality of RF signals;
   adding to the temporal map the first RF signal frequency, the at least a first parameter associated with the first RF signal, the first longitude, the first latitude and the first altitude; and
   generating a temporal map when no temporal map exists for the area from which the RF signals are detected.

2. The method of claim 1, wherein the plurality of RF signals is detected using a communication module that includes a software defined radio (SDR).

3. The method of claim 1, wherein the at least a first parameter is at least one of: a signal-to-noise ratio, permanent noise, and RF signal strength.

4. The method of claim 1, further comprising:
   detecting the plurality of RF signals over a predetermined spectrum of frequencies at a second longitude, a second latitude and a second altitude;
   analyzing the plurality of RF signals to determine at least a second parameter associated with at least a second RF signal of the plurality of RF signals; and,
   adding to the temporal map the second RF signal frequency, the at least a second parameter associated with the second RF signal, the second longitude, the second latitude and the second altitude.

5. The method of claim 1, further comprising:
   storing the temporal map within a database.

6. The method of claim 1, wherein the vehicle is an unmanned aerial vehicle (UAV).

7. A non-transitory computer readable medium having stored thereon instructions for causing a processing circuitry to perform a process, the process comprising:
   detecting a plurality of RF signals over a predetermined spectrum of frequencies at a first longitude, a first latitude and a first altitude;
   analyzing the plurality of RF signals to determine at least a first parameter associated with at least a first RF signal of the plurality of RF signals;
   adding to the temporal map the first RF signal frequency, the at least a first parameter associated with the first RF signal, the first longitude, the first latitude and the first altitude; and
   generating a temporal map when no temporal map exists for the area from which the RF signals are detected.

8. A system for generating a temporal map of radio frequency (RF) signals detected from a vehicle, the system comprising:
   a processing circuitry;
   an antenna connected to the processing circuitry, where the antenna is configured to detect radio frequency (RF) signals;
   an RF receiver connected to the processing circuitry and the antenna, where the RF receiver is configured to converts the information carried by the RF signals received by the antenna into a usable form; and
   a memory coupled to the processing circuitry, the memory containing therein instructions that, when executed by the processing circuitry, configure the system to:
      detect a plurality of RF signals over a predetermined spectrum of frequencies at a first longitude, a first latitude and a first altitude;
      analyze the plurality of RF signals to determine at least a first parameter associated with at least a first RF signal of the plurality of RF signals;
      add to the temporal map the first RF signal frequency, the at least a first parameter associated with the first RF signal, the first longitude, the first latitude and the first altitude; and generate a temporal map when no temporal map exists for the area from which the RF signals are detected.

9. The system of claim 8, wherein the plurality of RF signals is detected using a communication module that includes a software defined radio (SDR).

10. The system of claim 8, wherein the at least a first parameter is at least one of: a signal-to-noise ratio, permanent noise, and RF signal strength.

11. The system of claim 8, wherein the system is further configured to:
   detect the plurality of RF signals over a predetermined spectrum of frequencies at a second longitude, a second latitude and a second altitude;
   analyze the plurality of RF signals to determine at least a second parameter associated with at least a second RF signal of the plurality of RF signals; and,
   add to the temporal map the second RF signal frequency, the at least a second parameter associated with the second RF signal, the second longitude, the second latitude and the second altitude.

12. The system of claim 8, wherein the system is further configured to:
   store the temporal map within a database.

13. The system of claim 8, wherein the vehicle is an unmanned aerial vehicle (UAV).

* * * * *